(12) United States Patent
Black (10) Patent No.: US 7,793,001 B2
(45) Date of Patent: Sep. 7, 2010

(54) PACKET COMPRESSION FOR NETWORK PACKET TRAFFIC ANALYSIS

(75) Inventor: Richard John Black, Cambridge (GB)

(73) Assignee: Microsoft Corporation, Redmond, WA (US)

( * ) Notice: Subject to any disclaimer, the term of this patent is extended or adjusted under 35 U.S.C. 154(b) by 354 days.

(21) Appl. No.: 12/118,595

(22) Filed: May 9, 2008

(65) Prior Publication Data
US 2009/0281984 A1 Nov. 12, 2009

(51) Int. Cl.
*G06F 15/16* (2006.01)
*G06F 15/173* (2006.01)
*H04J 3/18* (2006.01)

(52) U.S. Cl. .................. 709/247; 709/224; 370/477
(58) Field of Classification Search .................. 709/224, 709/247; 370/477
See application file for complete search history.

(56) References Cited

U.S. PATENT DOCUMENTS

| | | | |
|---|---|---|---|
| 4,771,391 A | 9/1988 | Blasbalg | |
| 5,978,386 A | 11/1999 | Hamalainen et al. | |
| 6,560,206 B1 | 5/2003 | Naden et al. | |
| 7,016,351 B1 | 3/2006 | Farinacci et al. | |
| 2003/0074476 A1 | 4/2003 | Kim et al. | |
| 2004/0085906 A1 | 5/2004 | Ohtani et al. | |
| 2004/0090989 A1 * | 5/2004 | Kobayashi | .................. 370/469 |
| 2006/0129689 A1 | 6/2006 | Ho et al. | |
| 2007/0186130 A1 | 8/2007 | Holm et al. | |
| 2007/0211724 A1 | 9/2007 | Johansson et al. | |
| 2008/0025312 A1 | 1/2008 | Kuppuswamy et al. | |

OTHER PUBLICATIONS

Holanda, et al., "Performance Analysis of a New Packet Trace Compressor based on TCP Flow Clusterling"<<http://www.netbook.cs.purdue.edu/othrpags/page22.htm>>, 2005, pp. 1-7.
Meek, "Wide Area Network Packet Capture and Analysis"; <<http://linuxgazett Using the Raw Packet Data>>, Jon Meek, 2001, pp. 1-15.
"Packet Trace Data Files", <http://www.netbook.cs.purdue.edu/othrpags/page22.htm>>, printed from the internet on Feb. 27, 2008, pp. 1-2.
Pang, et al., "A High-level Programming Environment for Packet Trace Anonymization and Transforamtion", ACM, 2003, pp. 1-13.

* cited by examiner

*Primary Examiner*—Philip J Chea
(74) *Attorney, Agent, or Firm*—Lee & Hayes, PLLC (57) ABSTRACT

Methods of capturing and compressing trace data for use in network packet traffic analysis are described. In an embodiment, when a packet is received, two records of the packet are created and stored. One record is stored in a file associated with the source address of the packet and the other record is stored in a file associated with the destination address of the packet. Various packet compression techniques are described and one example compares a newly received packet to the previous packet which has been stored in the same file and sets bits in the record which denote whether fields in the newly received packet are the same as the corresponding fields in the previous packet.

7 Claims, 13 Drawing Sheets

PACKET COMPRESSION FOR NETWORK PACKET TRAFFIC ANALYSIS

BACKGROUND

Network packet traffic analysis may be performed in a number of different ways: the analysis may be performed in real time (on-line) or from stored data (off-line) and the data analyzed may represent a substantially complete record of packet activity or the data may be sampled from the network and therefore represent only a small fraction of the packets in the network. A substantially complete record of packet activity is known as a trace.

A capturing agent may be used to capture a trace by capturing data and storing it on disk. Where the speed at which data arrives exceeds the speed that the data can be written to a disk, packets may be truncated and truncated packets stored. Each truncated packet is shorter than a complete packet and comprises the front portion of a packet without the end portion of the packet. The length of the truncated packet is known as the snap-length. Having captured a trace, the data may be analyzed in many different ways and many different aspects of the data may be investigated.

Typically a trace comprises complete or truncated packets captured over a short period of time or the trace comprises a statistical sampling of the number and temporal distribution of packets sent between machines.

The embodiments described below are not limited to implementations which solve any or all of the disadvantages of known methods of capturing trace data.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

Methods of capturing and compressing trace data for use in network packet traffic analysis are described. In an embodiment, when a packet is received, two records of the packet are created and stored. One record is stored in a file associated with the source address of the packet and the other record is stored in a file associated with the destination address of the packet. Various packet compression techniques are described and one example compares a newly received packet to the previous packet which has been stored in the same file and sets bits in the record which denote whether fields in the newly received packet are the same as the corresponding fields in the previous packet.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Figure 1:
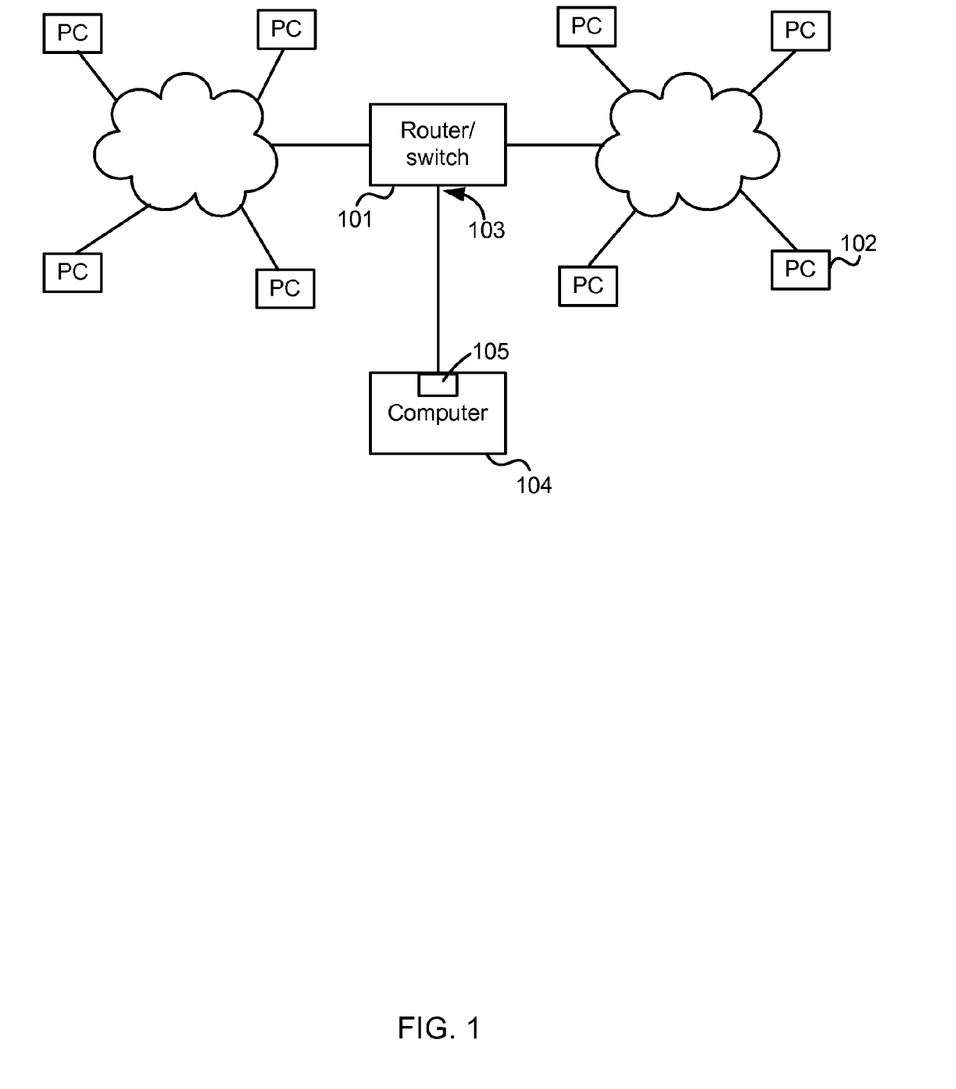
FIG. 1 is a schematic diagram of a network.

Trace captures are often taken at a SPAN (switched port analyzer) port on a router or switch which provides a stream of packets representing a copy of packets between one or more computers on each of one or more other ports. FIG. 1 is a schematic diagram of a network comprising a router/switch 101 and a number of computers 102 which may be interconnected in any way. Port mirroring may be used on the router/switch 101 to send a copy of all packets that pass through the router/switch 101 to a port 103 which is connected to a computer 104 which runs a capturing agent that captures the trace. The computer 104 receives the packets on a network card 105.

Figure 2:
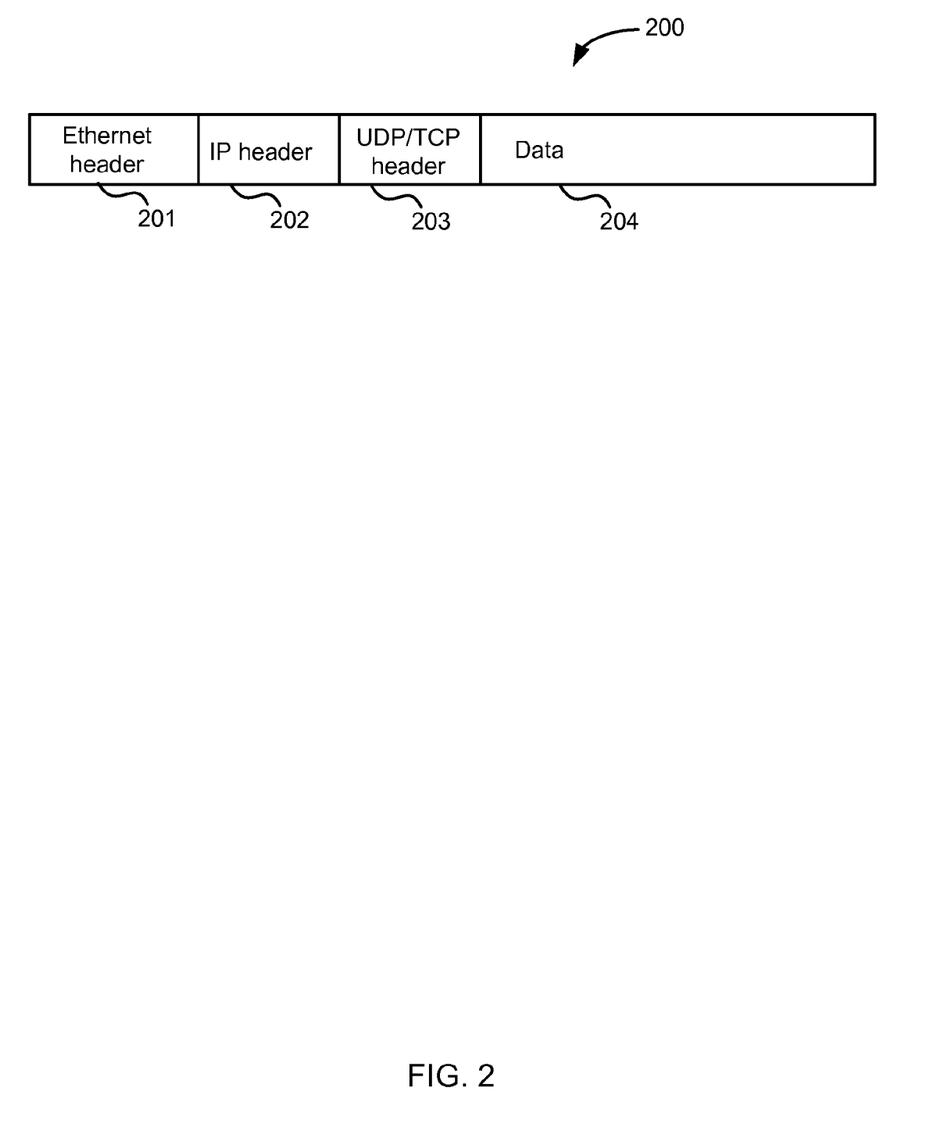
FIG. 2 is a schematic diagram of a packet in a computer network.

A typical packet 200 of interest in a computer network, as shown in FIG. 2, comprises an Ethernet header 201 of fourteen bytes, followed by an Internet Protocol (IP) header 202 which may be variable in length but which is at least twenty bytes and usually but not always twenty bytes. This IP header indicates the protocol of the packet which is usually either the unreliable datagram protocol (UDP) or the transport control protocol (TCP). If the UDP is indicated then the IP header is followed by a twenty byte UDP header 203. If the TCP is indicated then the IP header is followed by a variable length TCP header 203 which is at least twenty bytes and usually but not always twenty bytes. These headers 201-203 are followed by the data 204 which might be the user's data and/or a header belonging to some higher level protocol. The amount of data is variable, but the total length of the packet is less than the frame limit which is usually fifteen hundred and fourteen bytes.

Figure 3:
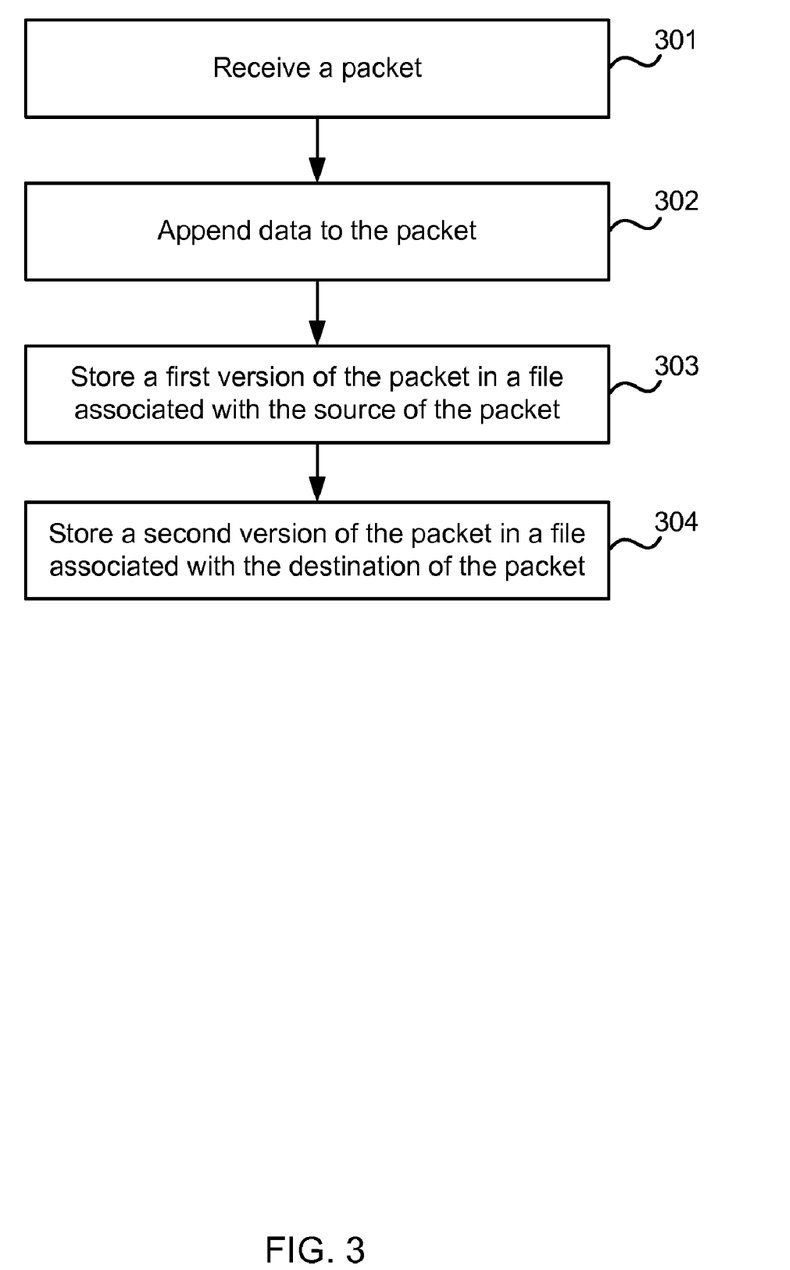
FIG. 3 is a flow diagram of an example method of capturing trace data.

FIG. 3 is a flow diagram of an example method of capturing trace data. A packet is received (block 301) and data is appended to the packet (block 302). A first version of the packet with the appended data is then stored in a file associated with the source of the packet (block 303) and a second version of the packet with the appended data is stored in a file associated with the destination of the packet (block 304). The first and second versions of the packet with appended data may be identical or they may be different (as described in more detail below).

When data is appended to the packet (in block 302), data which is in the packet, such as some or all of the user's data, may also be removed e.g. packets may be truncated (or snapped) to conserve disk space, or disk bandwidth, or to reduce the privacy impact of storing the portion of the packet comprising data rather than headers. In an example, the computer records the current time when the packet arrives, the length of the packet and the amount of the data which will be snapped (i.e. captured) and not discarded. The computer then appends the time (usually requiring eight bytes) and the two lengths (usually requiring four bytes each) to the packet (snapped to at least 14+20+20 but frequently a value such as 128 bytes) and this is output to the storage device, e.g. a disk.

The versions of the packets stored (in blocks 303 and 304) may comprise packet records instead of the packets themselves (either full or truncated packets). Examples of packet records are described in more detail below.

Using the method shown in FIG. 3, multiple files are used to record packet information. A multiplicity of files is used, with in many cases one file for each network address, though a file may be used for several addresses. Each packet record is written to two files, the file for the source address of the packet (in block 303), and the file for the destination address of the packet (in block 304). For broadcast packets, the file for the destination address may comprise a file for the broadcast address. Alternatively, broadcast packets may be stored in the files for multiple destination addresses; however this is less efficient.

By dividing the trace data into multiple files, the packets relevant to a computation for a single computer (or a group of computers) can be processed more efficiently since only the file for that computer must be read; or, if broadcast packets are relevant, the files for the address of that computer and the file for the broadcast address of the portion of the network where the computer is present. Additionally the files are more easily processed in parallel on a cluster, since the files required for any particular processing component are much reduced.

When a packet is stored as part of a captured trace, either using the method of FIG. 3 or another method of capturing trace data, the packet may be compressed. As described above, the packet may be snapped (or truncated) to a particular length (the snap length) but in other examples, further compression techniques may be used. The following description describes a number of different compression techniques which may be used together (in any combination) or independently.

Figure 4:
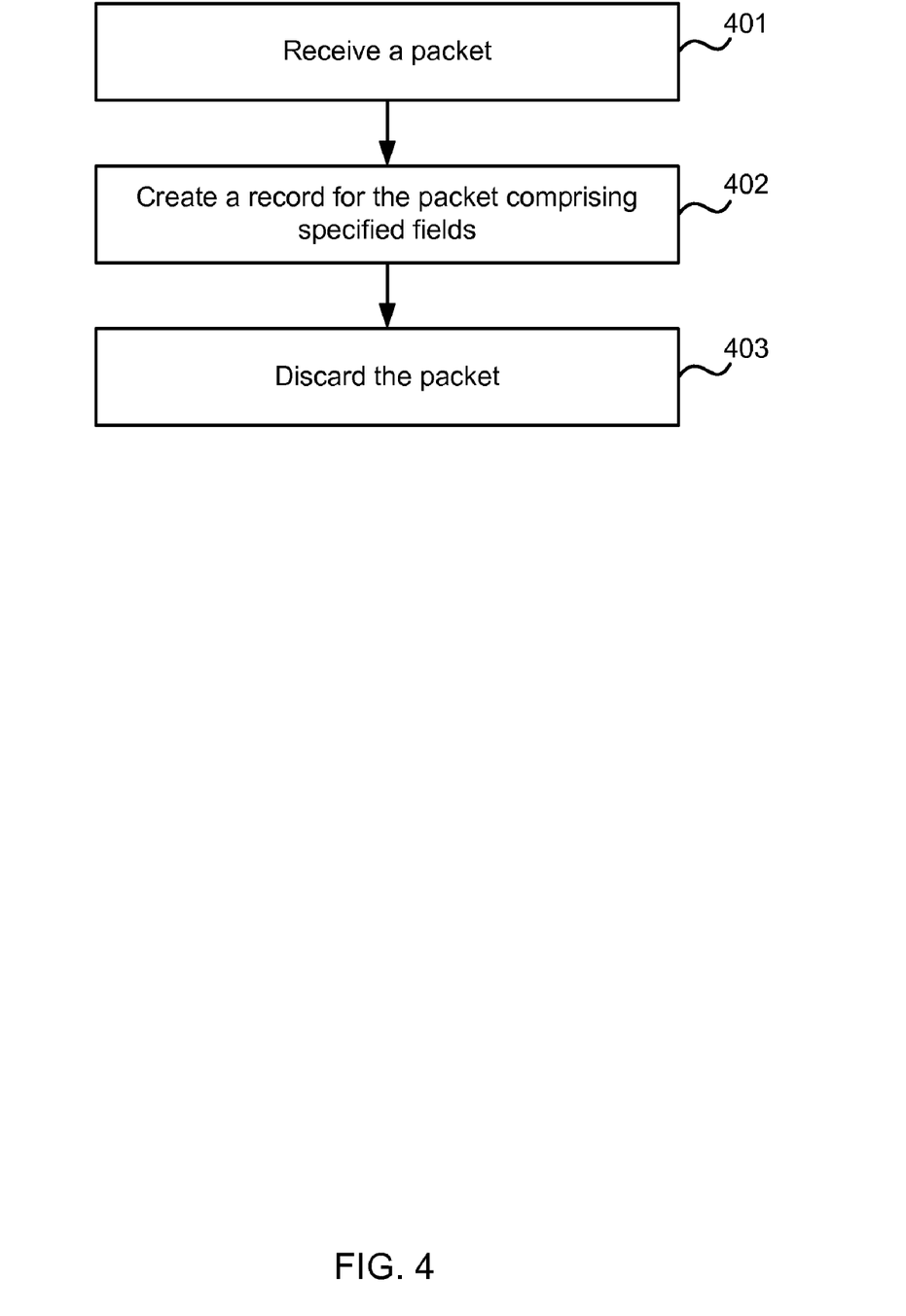
FIGS. 4-8 are flow diagrams of example methods of compressing trace data.

FIG. 4 is a flow diagram of an example method of compressing trace data. A packet is received (block 401) and a packet record is created for the packet which comprises specified fields associated with the packet (block 402). The record may encode these specified fields. Having created the packet record (in block 402), the packet is discarded (block 403). The specified fields which are encoded (or otherwise stored) in the packet record may be those fields associated with the original received packet which are generally used in the analysis of network data. These fields may, for example, comprise one or more of: the time of the frame, the source and destination addresses, whether the packet is UDP or TCP, the port numbers, and whether the packet was empty or not (e.g. whether the packet 200, as shown in FIG. 2, comprises any data 204). In some implementations some encoding of TCP's protocol flags may also be present in the packet record. In other examples, different fields may be included within the packet record which is generated.

Figure 5:
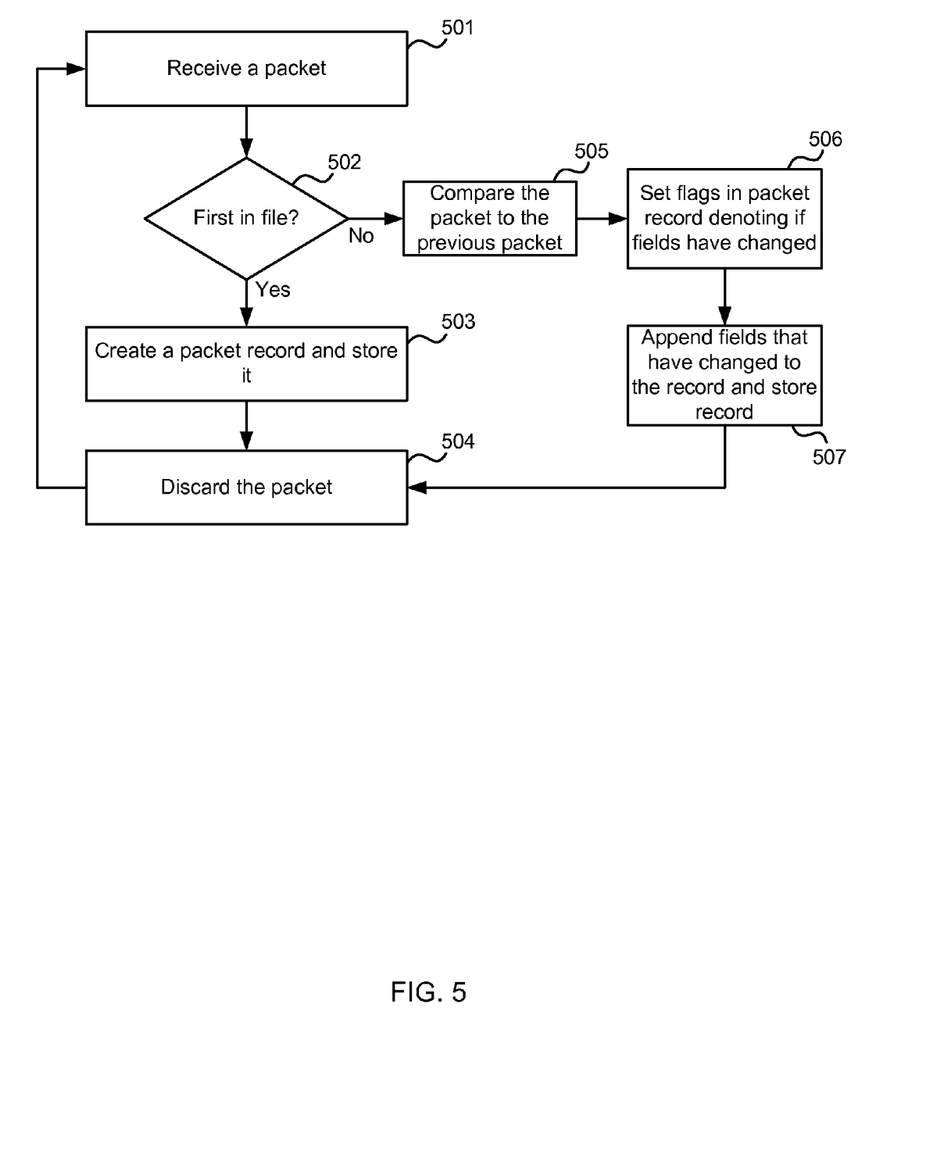

FIG. 5 is a flow diagram of another example method of compressing trace data. A packet is received (block 501) and if it is the first packet to be stored in a trace file ('Yes' in block 502), a packet record is created and stored for the packet (block 503). This packet record may, as described above, comprise specified fields which are to be used in analysis of the trace. The received packet is then discarded (block 504). If however, the packet is not the first to be stored in a trace file ('No' in block 502), the packet is compared to the previously stored packet record (block 505) and a packet record for the newly received packet is created which comprises flags which are set to denote whether each of the specified fields have changed from the previously stored packet record (block 506). These flags which denote whether fields have changed between packets are encoded using bits grouped together in one of more bytes which may be referred to as a 'flag byte' or 'flag bytes'. Where fields have changed, these changed fields are appended to the packet record (block 507) and the received packet is then discarded (block 504). The method may then be repeated for each packet received.

This method provides a compression format for the fields (which are themselves larger than one bit) from one packet to the next within a file in which a single bit is used to indicate whether a field would have the same value as the field in the previous packet. This provides significant compression of the size of the trace.

In addition to compressing the fields, as described above, the time of the packet can also be compressed. Instead of storing the absolute time at which the packet was observed, the difference in time from one packet to the next may be stored. Such a difference is likely to be a smaller value than the absolute time of arrival. For example, two bits in the flag byte may be used to encode whether the time is represented by a one byte, two byte or four byte difference, or by an eight byte absolute time. This significantly reduces the size of the stored file and improves the performance of analysis through the much reduced data volumes.

Figure 6:
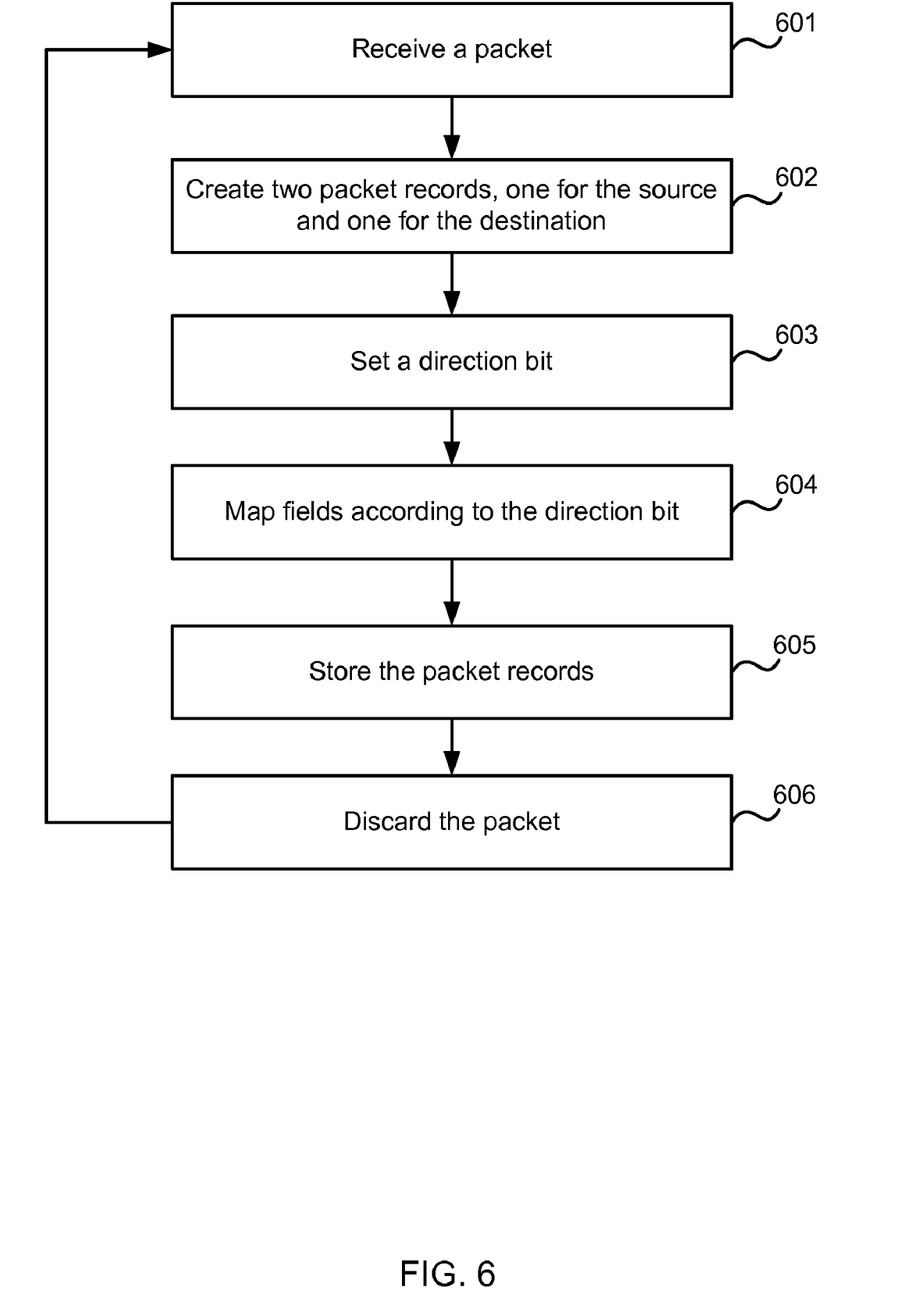

FIG. 6 is a flow diagram of a further example method of compressing trace data. A packet is received (block 601) and two packet records are created (block 602)—one associated with the source address and one associated with the destination address. Within each packet record a direction bit is set (block 603) which indicates whether the packet is being sent to or from the address with which the packet record is associated, i.e. in the packet record associated with the source address, the direction bit will indicate that the packet was being sent from the associated address and in the packet record associated with the destination address, the direction bit will indicate that the packet was being sent to the associated address. The two packet records created are therefore not the same. The fields in the packet record are then mapped according to the direction bit (block 604). For example, instead of having source port and destination port fields, the record encodes local port and remote port fields. If the packet is an input at the address represented in the current file then the destination port is represented in the local port field; if the packet is an output at the address then the destination port would be represented in the remote port field. The created packet records are then stored (block 605) and the received packet discarded (block 606). The packets may be stored in two separate files, one associated with the source address and one associated with the destination address (e.g. as described above with reference to FIG. 3).

Figure 7:
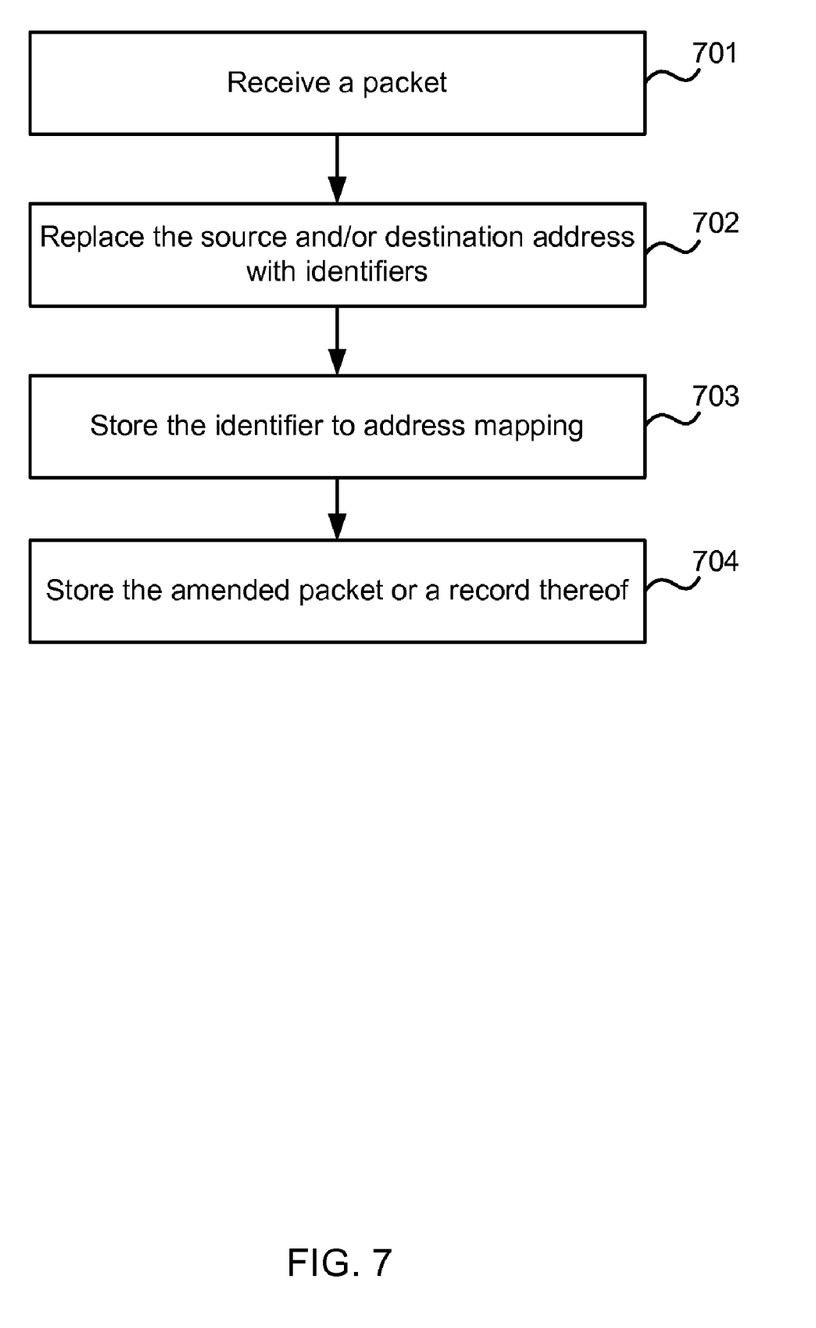

Another optimization for collecting trace data is shown in FIG. 7, in which the address of the peer host for a packet is not stored directly in the file, instead an indirect identifier is stored (and potentially compressed using the method and system described above). For a packet or packet record associated with a source address, the peer host address is the destination address or vice versa. When a packet is received (block 701), the source and/or destination address is replaced by an identifier for each replaced address (block 702). The mapping between the actual address and the identifier is stored (block 703), for example in a library or dictionary, and the amended packet or a packet record for the packet (as described above) is stored (block 704). Where a packet record is stored, the original received packet may be discarded (not shown in FIG. 7).

The use of an identifier instead of an actual address, as shown in FIG. 7, enables additional compression because the number of addresses present on the network of interest is likely to be smaller than the actual size of an address. Furthermore, the dictionary consulted to find the address represented by the identifiers need not be made available to the persons (or machines) processing the packet data; or alternatively a different dictionary to which a prefix conserving anonymization technique has been applied can be provided instead. Thus the private details of the original addresses in the trace can be completely and easily separated from the main trace data on which the computations will be carried out, thereby improving privacy. Previously two copies of the trace were stored—one containing the actual addresses and one containing anonymized addresses (e.g. addresses to which a prefix conserving anonymization technique has been applied) and therefore use of this method also reduces storage requirements.

Figure 8:
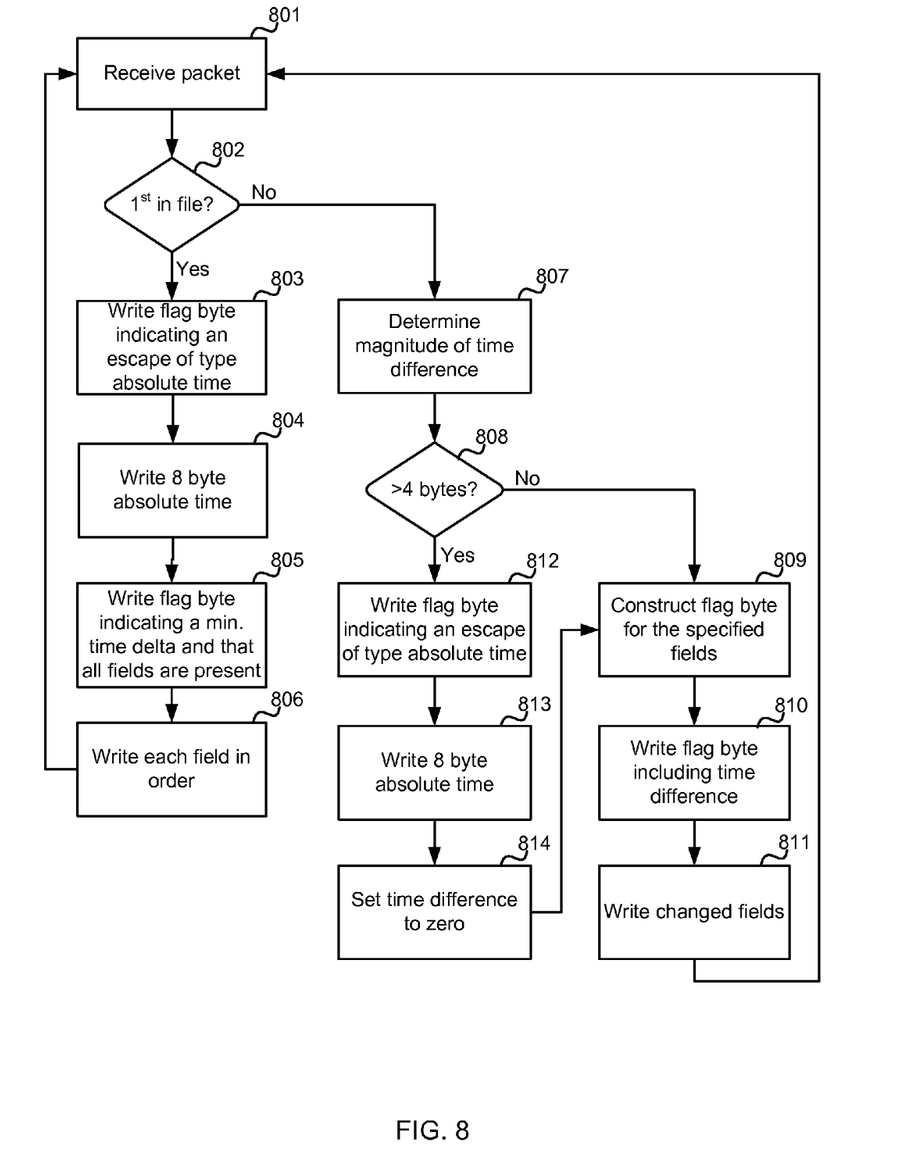
Figure 9:
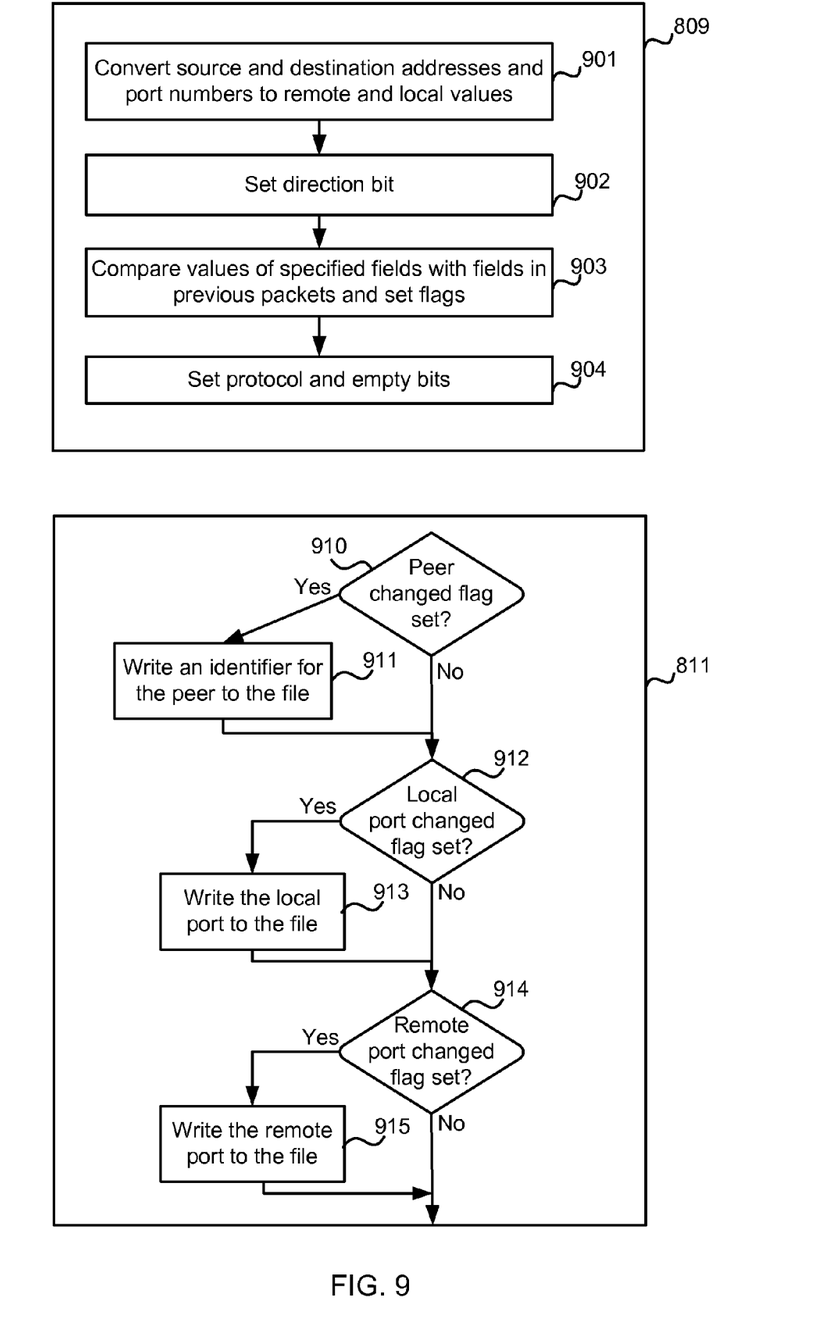
FIG. 9 shows example implementations of two method blocks from FIG. 8 in more detail.

FIG. 8 illustrates the process of creating a compressed trace file for a single address (or group of addresses) from a source of original packets and the packet records stored are referred to herein as being in 'Reduced Packet Format' (RPF). It will be appreciated that the method will be implemented in parallel for both the source and destination addresses; however FIG. 8 only a single process flow is shown for purposes of clarity. The method shown in FIG. 8 uses all of the compression techniques and optimizations described above, although in other examples only some of those techniques and/or optimizations may be employed. FIG. 9 shows flow diagrams of example implementations of blocks 808 and 810 of the method shown in FIG. 8 in more detail.

When a packet is received (block 801), the method checks if this is the first packet in the file (block 802), i.e. whether this is the first packet received having this particular address as either the source or the destination address. If the packet received is the first packet in the file ('Yes' in block 802), a flag byte indicating an escape of type absolute time is written (block 803) and the absolute time is also written (block 804). A flag byte is written indicating a minimum sized time delta and that all other fields are present (block 805) followed by each of the fields (block 806) and these fields may be written in a predefined order.

If, however, the packet is not the first in the file ('No' in block 802), the time of the packet received (in block 801) is compared to the time of the previous packet, a packet record for which has been previously stored in the file, to determine the magnitude of the time difference between the two packets (block 807). If the time difference (also referred to as the time delta) does not exceed four bytes ('No' in block 808), then a flag byte is constructed for the specified fields (block 809). As described above with reference to FIG. 5 and shown in more detail in FIG. 9, this flag byte is constructed by converting the source and destination addresses and port numbers into local and remote values (block 901) and setting the direction bit (block 902). The values of the specified fields (e.g. peer address, local port and remote port) in the current packet (received in block 801) are compared to the corresponding values in the previous packet and bits in the flag byte are set to denote whether the values have changed (block 903). In order to perform this comparison, the previous uncompressed packet record may be stored. In addition the protocol and empty bits are set (block 904).

The flag byte, including the time difference between the current and previous packets, is then written to the file (block 810) followed by the values of any of the fields which have changed (block 811), as shown in more detail in FIG. 9. If the peer changed bit is set ('Yes' in block 910) then an identifier for the peer is written to the file (block 911). This may require consulting the dictionary including adding a new identifier to the dictionary if the address has not previously been seen (not shown in FIG. 9). If the local port changed bit is set ('Yes' in block 912), the local port is written to the file (block 913) and if the remote port changed bit is set ('Yes' in block 914), the remote port is written to the file (block 915).

If the time difference is larger than will fit in four bytes ('Yes' in block 808), then a flag byte is written indicating an escape of type absolute time (block 812) followed by an eight byte absolute time (block 813). The time difference is then set to zero (block 814) and a second flag byte is constructed for the specified fields (block 809 and as shown in more detail in FIG. 9). This second flag byte, including the time difference between the current and previous packets (which was set to zero in block 814) is then written to the file (block 810) followed by the values of any of the fields which have changed (block 811 and as shown in more detail in FIG. 9). The method may then be repeated for subsequent packets received.

Figure 10:
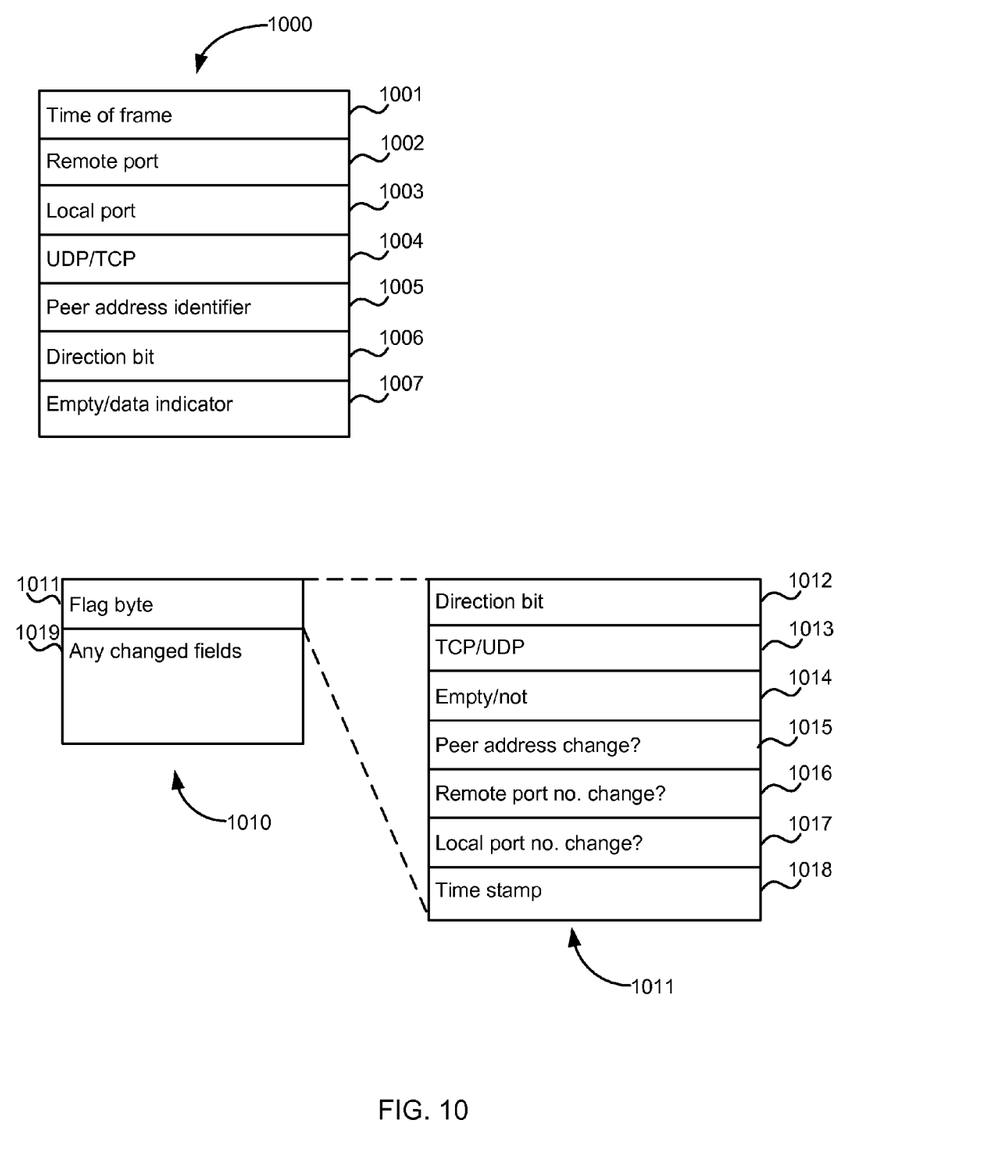
FIG. 10 shows a comparison between two formats of a packet record.

FIG. 10 shows a comparison between the Reduced Packet Format 1010 of a packet record and an expanded format 1000 of a packet record. In the example shown, the expanded format 1000 comprises values for each of the following: the time of the frame (or packet) 1001, the remote port number 1002, the local port number 1003, a protocol field 1004 (e.g. indicating whether TCP or UDP is used), a peer address identifier 1005, a direction bit 1006 and a field indicating whether the packet comprised any user data or not 1007. The data elements may be arranged in any order. The RPF 1010 comprises the flag byte 1011 and values for any fields that have changed 1019 (e.g. as written in block 810). The flag byte comprises a direction bit 1012, a protocol bit 1013, an empty bit 1014, a time stamp 1018 (which may comprise two bits, as described above) and bits 1015-1017 indicating whether the peer address, remote port number and local port number have changed since the previous packet.

The RPF 1010 is the format in which the trace is stored and the expanded format 1000 may be the format which is used when the trace is processed. The decompression process (i.e. conversion from expanded format 1000 to RPF 1010) is described below with reference to FIG. 12.

Since many communication patterns in real networks involve bursts bidirectional communication between computers, and since the encoding from source and destination has been transformed using the method shown in FIG. 8 to a direction and local and remote it can be seen that adjacent packets in the file are very likely to have identical values of local and remote port numbers and peer address and so these will compress very densely to a single flag each (bits 1015-1017 in the example in FIG. 10) indicating that they are the same as the previous packet.

Moreover, even on a busy server computer with many simultaneous connections the local port indicating the service on the computer which is receiving and transmitting many packets will also be identical from packet to packet and hence can also be condensed to a single bit 1017. Not only does this save very large amounts of storage space in the file, and save on the time to read and write the file to disk, but it can also be used to optimize actual processing of the file since several forms of processing can be enhanced if they can more rapidly identify that certain aspects of a packet are the same as previously. For example, packet processing may begin by determining the flow or channel associated with a packet and this step can be elided if can rapidly be determined that the flow or channel of some packet will be the same as the flow or channel determined for the previous packet.

Figure 11:
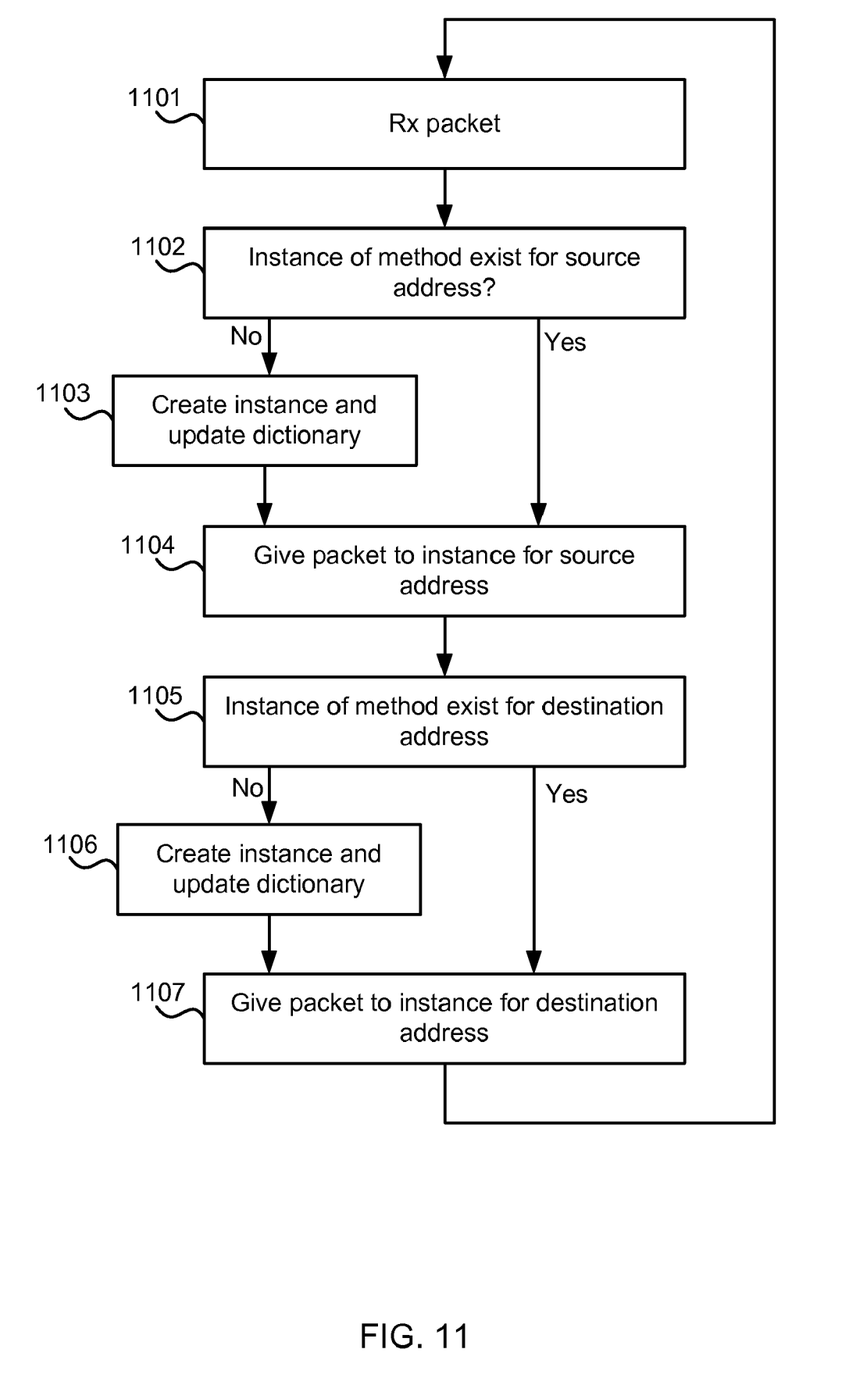
FIG. 11 shows a flow diagram of a method of converting a stream of packets into multiple files using a multiplicity of instances of the method shown in FIG. 8.

As described above, and shown in FIG. 3, a stream of packets may be stored in multiple files, with each file being associated with an address (or group of addresses). FIG. 11 shows a flow diagram of a method of converting a stream of packets into multiple files using a multiplicity of instances of the method shown in FIG. 8. When a packet is received (block 1101), the method checks to see if an instance of the method of FIG. 8 exists for the source address of the packet (block 1102). If such an instance does not exist ('No' in block 1102) then one is created and the dictionary is updated (block 1103) to include a new mapping between an indirect identifier (as described above) and the actual address. The packet is then given to the instance of the method for the source address (block 1104). The method then checks to see if an instance of the method of FIG. 8 exists for the destination address of the packet (block 1105). If such an instance does not exist ('No' in block 1105) then one is created and the dictionary is updated (block 1106) to include a new mapping between an indirect identifier (as described above) and the actual destination address. The packet is then given to the instance of the method for the destination address (block 1107). The method is then repeated for subsequent packets received.

Whilst the above description in relation to FIG. 11 describes generating packets associated with each address, in many examples, files may only be created for a subset of addresses. In such an example, the method shown in FIG. 11 may be modified such that for each new source/destination address the dictionary is updated (e.g. in blocks 1103 and 1106) but that new instances are generated only for the subset of addresses where files are required.

The method and system described above enables the processing of packets into files to be performed with an exceptionally high degree of parallelism using all the available processing cores or computers, since the only time that co-ordination is required is when the dictionary is to be updated (in blocks 1103 and 1106 in FIG. 11) and that happens only rarely on the first time that an address is seen in the network. In an example, packets may be received in blocks (e.g. in 10 GB slices) and each core may deal with a separate block of packets. Typically the packets are received in blocks which are divided in time by the capture device such that each block is not bigger than a disk. Each core may run an instance of the method of FIG. 8 (the RPF writer) for each address such that each core generates a file for each address which is a source or destination address for one of the packets it processes. This results in multiple files for a single address (e.g. where files are generated by different cores) and these may subsequently be combined into a single file per address.

Whilst this provides one example parallelization technique, in another example, one machine or core may perform the method shown in FIG. 11 and different machines/cores may perform different instances of the method of FIG. 8. As described above, each machine/core involved refers back to and updates a central dictionary.

Where a trace file is used for multiple addresses, the methods used may be the same as described above. Alternatively, an extra field or flag may be used to indicate which of the multiple addresses is the source/destination address for a particular packet record. Use of such a field or flag enables the trace file to be separately divided into individual files for each of the addresses. A trace file for multiple addresses may, for example, be compiled where a single machine has multiple addresses on a single interface (e.g. IPv4 and IPv6) or on multiple interfaces.

Experimental results have demonstrated the compression which is achievable using the methods described above. When the methods were applied to a 4500 GB dataset it was reduced it to a mere 70 GB. This represents a compression ratio in excess of 5000%, well beyond what is achievable with general purpose compression techniques. In addition the resulting dataset was easier to process and parallelize on a cluster of computers.

The methods described herein and the resulting large compression ratio enable a trace to be captured which provides data on all packets captured over a large period of time and/or for a large number of machines.

In the methods described above, all the packets received result in a packet or packet record being stored. In other examples, the packets received may be filtered e.g. so that only packets of interest are captured and stored in the trace. In an example, the filtering may be performed based on round trip time (RTT).

Figure 12:
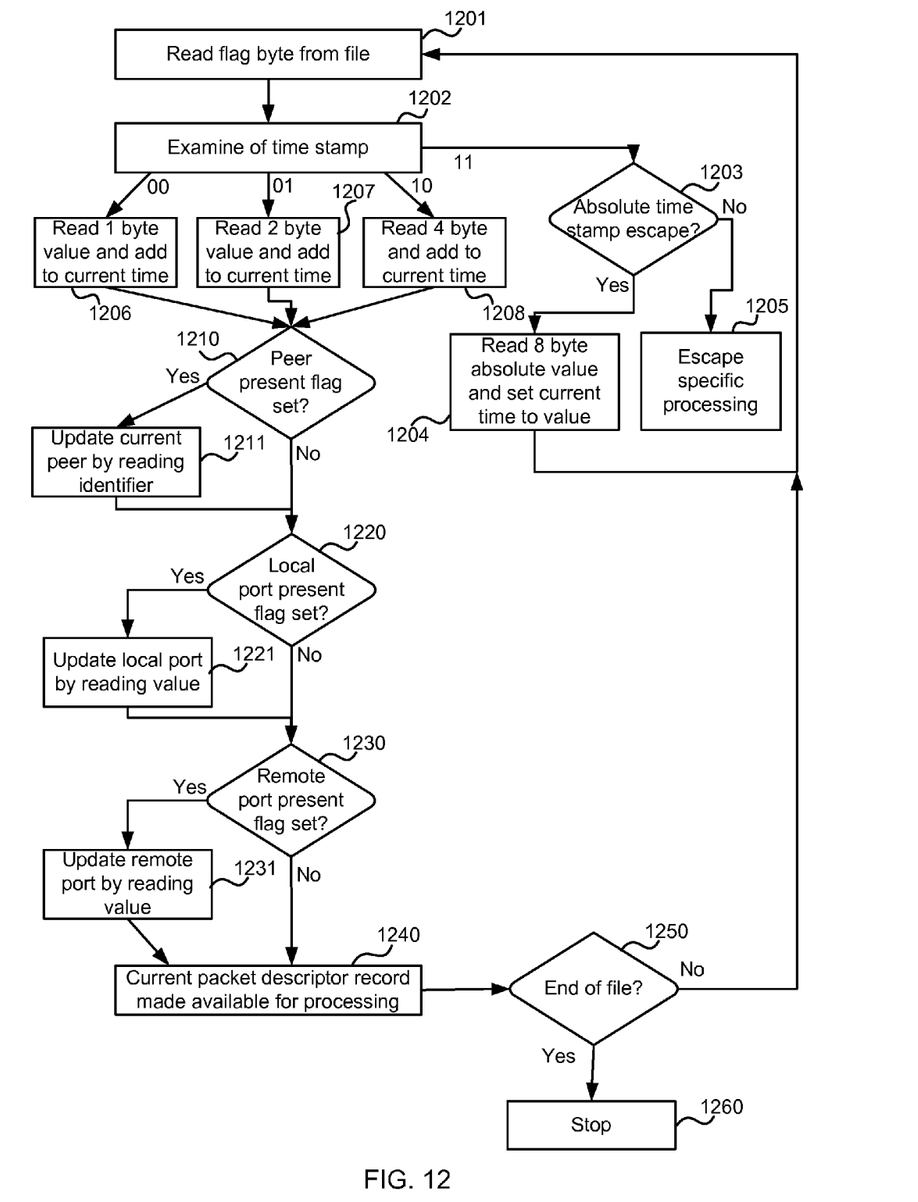
FIG. 12 illustrates the process of decompressing a compressed trace file.

FIG. 12 illustrates the process of decompressing a compressed trace file (which may be referred to as a Reduced Packet Format file), which may have been generated using the method shown in FIG. 8. This decompression may be performed for the purpose of processing the file e.g. to perform network packet analysis.

The method starts by reading a flag byte from the file (block 1201). If the byte is determined (in block 1202) to be an escape, as indicated by the two timestamp bits being both set, then the method checks if it is an absolute timestamp escape (block 1203). If it is ('Yes' block 1203) then an eight byte absolute time is read, the current time is set to this value (block 1204) and the method returns to the start and reads the next flag byte (block 1201). If it is some other type of escape ('No' in block 1203) then additional escape specific processing is performed (block 1205). If it was not an escape then the two bits which encode the size of the timestamp are examined (in block 1202) and if they are 00 then a single byte is read and added to the current time (block 1206). If the two bits are 01 then a two-byte value is read and added it to the current time (block 1207) and if they are 10 then a four-byte value is read and added to the current time (block 1208).

Where the two bits which encode the size of the timestamp are 00, 01 or 10, the method continues (following blocks 1206-1208) by checking to see if the peer present bit is set (block 1210) and if it is, the current peer is updated by reading a peer address identifier (block 1211). The method then checks to see if the local port present bit is set (block 1220) and if it is the current local port is updated by reading a port value (block 1221). The method then checks to see if the remote port present bit is set (block 1230) and if it is, the current remote port is updated by reading a port value (block 1231).

Having updated the values of the peer address identifier, local port and remote port if required (blocks 1210, 1211, 1220, 1221, 1230 and 1231), the current packet descriptor record (which is in expanded format 1000, as shown in FIG. 10) is made available for processing (block 1240) and then if the end of file has not been reached ('No' in block 1250) the method is repeated. The method stops (block 1260) when the end of the file is reached ('Yes' in block 1250).

The output comprises expanded format records and each expanded format record comprises a value for each field and each record stands independently (unlike RPF which is a comparison with a previous packet). The method of FIG. 12 (referred to as an RPF reader) hides the compression form the processing engine which performs the network packet traffic analysis.

Whilst the method of decompressing a compressed trace file shown in FIG. 12 demonstrates decompression of a compressed packet which has been created using all the compression techniques described above, it will be appreciated that in some examples the compressed packet may have been created using only a subset of the techniques described above. In such an example, a corresponding decompression method may comprise only a subset of the steps shown in FIG. 12.

Figure 13:
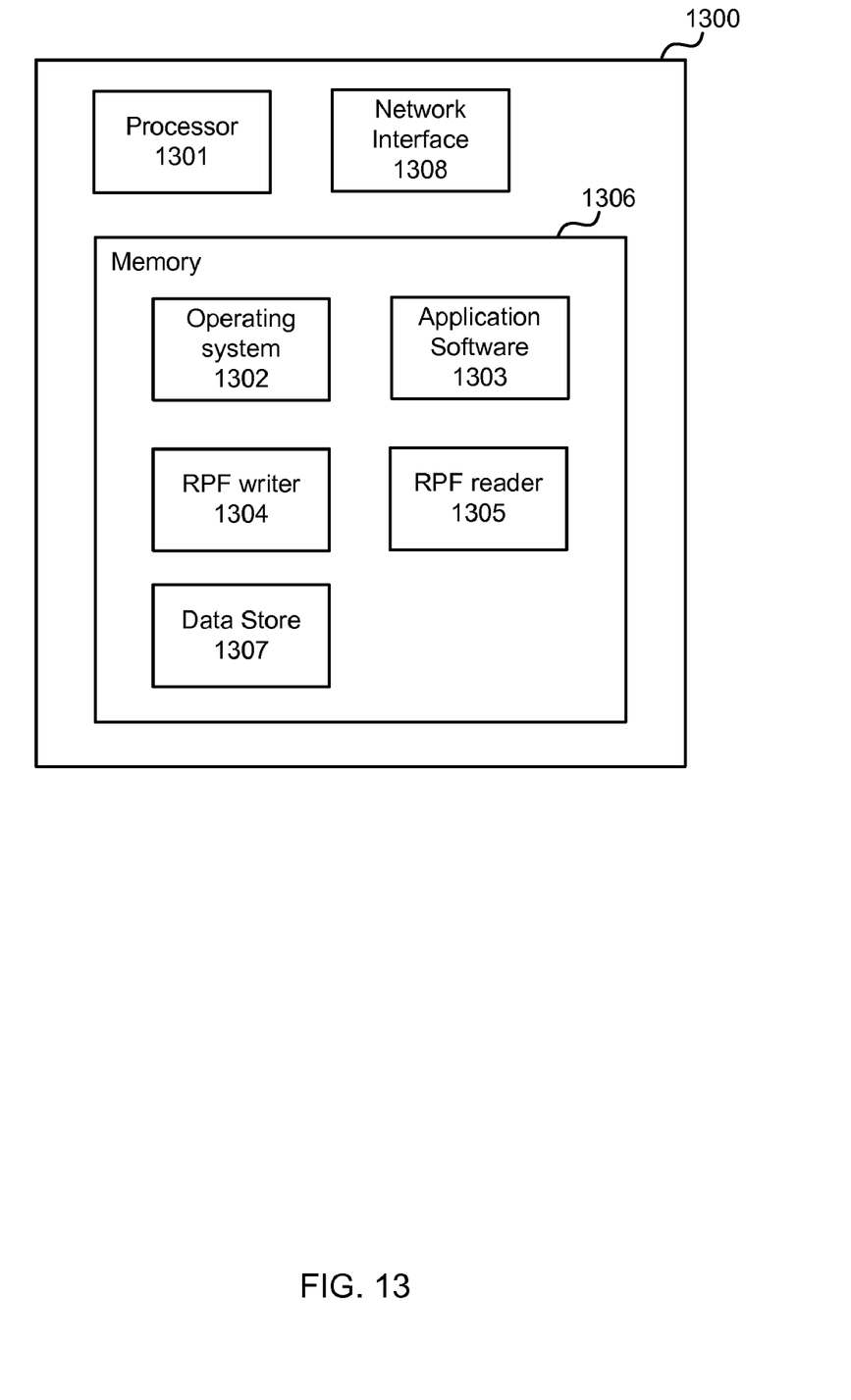
FIG. 13 illustrates an exemplary computing-based device in which embodiments of the methods described herein may be implemented.

FIG. 13 illustrates various components of an exemplary computing-based device 1300 which may be implemented as any form of a computing and/or electronic device, and in which embodiments of the methods described above may be implemented.

Computing-based device 1300 comprises one or more processors 1301 which may be microprocessors, controllers or any other suitable type of processors for processing computing executable instructions to control the operation of the device in order to generate and/or process packet traces. Platform software comprising an operating system 1302 or any other suitable platform software may be provided at the computing-based device to enable application software 1303-1305 to be executed on the device. The application software may comprise a RPF writer 1304 (e.g. which performs one or more of the methods shown in FIGS. 3-9 and 11) and/or a RPF reader (e.g. which performs the method shown in FIG. 12).

The computer executable instructions may be provided using any computer-readable media, such as memory 1306. The memory is of any suitable type such as random access memory (RAM), a disk storage device of any type such as a magnetic or optical storage device, a hard disk drive, or a CD, DVD or other disc drive. Flash memory, EPROM or EEPROM may also be used. The memory may also be used to provide a data store 1307 which may, for example, be used to store the compressed trace files and/or the decompressed trace files.

The computing-based device 1200 also comprises a network interface 1308 for receiving packets and may also comprise additional inputs and outputs (not shown in FIG. 13).

Although the present examples are described and illustrated herein as being implemented in a system as shown in FIG. 1, the system described is provided as an example and not a limitation. As those skilled in the art will appreciate, the present examples are suitable for application in a variety of different types of systems which comprise more than one computing device and which may be interconnected in any way.

The term 'computer' is used herein to refer to any device with processing capability such that it can execute instructions. Those skilled in the art will realize that such processing capabilities are incorporated into many different devices and therefore the term 'computer' includes PCs, servers, mobile telephones, personal digital assistants and many other devices.

The methods described herein may be performed by software in machine readable form on a tangible storage medium. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description of a preferred embodiment is given by way of example only and that various modifications may be made by those skilled in the art. The above specification, examples and data provide a complete description of the structure and use of exemplary embodiments of the invention. Although various embodiments of the invention have been described above with a certain degree of particularity, or with reference to one or more individual embodiments, those skilled in the art could make numerous alterations to the disclosed embodiments without departing from the spirit or scope of this invention.

The invention claimed is:

1. A method of capturing trace data for use in network packet traffic analysis, the method comprising:
   receiving a packet; and
   storing a representation of the packet in a file, said representation and said file being associated with one of a source address of the packet and a destination address of the packet, wherein storing a representation of the packet in a file comprises:
   if the file associated with an address is empty, creating and storing the associated representation, the associated representation comprising a time of the packet and a value for each of a set of fields; and
   if the file associated with an address comprises a representation of a previous packet, creating the associated representation by:

determining a time difference between said packet and said previous packet;

if a magnitude of the time difference exceeds a threshold, storing the time of said packet and setting a value of the time difference to zero;

setting a flag in the representation for each of the set of fields, each flag identifying if a value of a field in said packet is the same as a value of said field in said previous packets;

storing each said flag and the time difference; and storing the value of each field from the set of fields where the value of the field in said packet is not the same as the value of the field in the previous packet.

2. A method according to claim 1, further comprising: storing a second representation of the packet in a second file, said second representation and said second file being associated with another of said source address of the packet and said destination address of the packet.

3. A method according to claim 2, wherein the first representation and the second representation are the same.

4. A method according to claim 1, wherein a representation of a packet comprises a truncated packet.

5. A method according to claim 1, wherein a representation of a packet comprises values of specified fields.

6. A method according to claim 1, wherein
setting the flag in the representation indicates whether the address associated with the representation is the source address or the destination address.

7. A method according to claim 1, wherein each representation comprises at least one of a source address and a destination address and wherein storing two representations of the packet in separate files comprises, for each representation:

replacing an address in the representation with an identifier;

storing a mapping between the address and the identifier in a separate file; and storing the representation.

* * * * *